United States Patent [19]

Mumford et al.

[11] Patent Number: 4,624,885
[45] Date of Patent: Nov. 25, 1986

[54] LOW DENSITY MATRIX RESINS FOR FILAMENT WOUND CHAMBERS COMPRISING CHAIN EXTENDED CARBOXY-TERMINATED POLYBUTADIENES

[75] Inventors: Neal A. Mumford; Ben A. Lloyd, both of Brigham City, Utah

[73] Assignee: Morton Thiokol, Inc., Chicago, Ill.

[21] Appl. No.: 675,901

[22] Filed: Nov. 28, 1984

[51] Int. Cl.[4] .............................................. D03D 13/00
[52] U.S. Cl. .................................... 428/222; 156/175; 428/224; 428/364; 428/408; 428/902
[58] Field of Search .............. 156/334, 172, 173, 175, 156/166, 169; 428/36, 377, 902, 408, 222, 224, 364

[56] References Cited

U.S. PATENT DOCUMENTS

| | | | |
|---|---|---|---|
| 3,062,242 | 11/1962 | Vanderbilt | 138/141 |
| 3,515,772 | 6/1970 | Lubowitz et al. | 260/836 |
| 3,528,878 | 9/1970 | Lubowitz et al. | 161/188 |
| 3,616,193 | 10/1971 | Lubowitz et al. | 161/190 |
| 3,673,274 | 6/1972 | Tomalia et al. | 260/836 |
| 3,759,777 | 9/1973 | Lubowitz et al. | 156/330 |
| 3,853,815 | 12/1974 | Lubowitz | 260/63 R |
| 3,931,354 | 1/1976 | Sheppard et al. | 260/836 |
| 3,970,495 | 7/1976 | Ashton | 156/162 |
| 4,016,022 | 4/1977 | Browning et al. | 428/408 |
| 4,039,006 | 8/1977 | Inoue et al. | 138/129 |
| 4,338,225 | 7/1982 | Sheppard | 525/122 |
| 4,421,806 | 12/1983 | Marks et al. | 428/36 |
| 4,427,482 | 1/1984 | Yamada et al. | 156/307.3 |

*Primary Examiner*—James J. Bell
*Attorney, Agent, or Firm*—Richard J. Sheridan; Gerald K. White

[57] ABSTRACT

Lightweight filament wound composites are provided which comprise fibers in a cured matrix resin. The resin, in its uncured state, comprises an aromatic vinyl hydrocarbon monomer and a chain-extended carboxy-terminated poly(1,2-butadiene) made by reacting a carboxy-terminated poly(1,2-butadiene) and a difunctional compound in an equivalents ratio of difunctional compound/carboxyl of about 0.5/1.

20 Claims, No Drawings

LOW DENSITY MATRIX RESINS FOR FILAMENT WOUND CHAMBERS COMPRISING CHAIN EXTENDED CARBOXY-TERMINATED POLYBUTADIENES

BACKGROUND OF THE INVENTION

1. Field of the Invention

This invention relates generally to filament wound composites wherein a low density resin is used as the matrix resin and the uncured resins used in their production.

2. Prior Art

Solid propellant rocket motor cases for missile systems, spacecraft boosters and other types of large and small high performance, lightweight pressure vessels are commonly made from fiber reinforcement and various formulations of polyepoxide resins (epoxy resins) by a filament winding process. Similarly, filament winding with both polyesters and epoxy resins has made possible production of lightweight tanks, poles, piping and the like. Historically, fiberglass has been the most common reinforcement fiber, but other fibers such as carbon filaments, boron filaments, and high modulus organic polymer filaments, most significantly aramid filaments, have become increasingly useful in these composite structures to take advantage of their differing and sometimes unique physical properties.

The resins utilized are typically epoxy formulations based on diglycidyl ether-bisphenol A (DGEBA), reactive low molecular weight epoxy diluents and curing agents such as aliphatic and aromatic amines and carboxylic acid anhydrides. Both flexibilized and rigid epoxy resins have been used as matrix resins for filament wound composite structures.

While the epoxy resins have proven useful in filament wound composites, they do have drawbacks. For example, they tend to be somewhat high in density. Densities of 1.2 to 1.3 g/cc are common. Also, they generally require relatively high proportions of resin, e.g., 35+% by weight, in the final composite. Composites based on epoxy resins are somewhat polar and hydrophilic and, thus, over a period of time, tend to absorb water from the atmosphere. These problems can be serious in applications where low weight is highly desirable, such as in aerospace applications. In addition, when epoxy resins are used with high modulus organic fibers, such as aramid fibers, there is often increased crack propagation due to weakness in the fiber's radial dimension resulting in reduced strength. This strength reduction can be corrected by precoating the fibers with substantial amounts of low viscosity lubricating or release agents. This prevents a too tight bond between the epoxy and fiber and distributes loads more evenly through the aramid fiber windings. However, while the release agent solves the problem of strength reduction it adds to the problem of weight control by increasing the weight of the composite.

Thus, a need exists for an improved resin-fiber composite which is of low density and low water pick-up, yet which provides high strength. The desired resin system should have physical and chemical properties in its uncured state, such as low viscosity and good pot life, that allow its use in production scale filament winding.

SUMMARY OF THE INVENTION

This invention provides improved, lightweight filament wound composites which in the cured state comprise fibers in a matrix resin, said resin comprising when uncured an aromatic vinyl hydrocarbon monomer and a chain-extended carboxy-terminated poly (1,2-butadiene) made by reacting a carboxy-terminated poly (1,2-butadiene) and a difunctional compound capable of reacting with carboxyl groups (hereinafter sometimes referred to simply as a "difunctional compound") in an equivalents ratio of difunctional compound/carboxyl of about 0.5/1.

This invention further provides an uncured resin-fiber combination in the form of a preimpregnated roving or tape which can be stored, if desired, for later use in filament winding applications or may be formed during the filament winding process. The resin-fiber combination comprises fibers impregnated with an uncured resin matrix comprising an aromatic vinyl hydrocarbon monomer and a chain-extended carboxy-terminated poly (1,2-butadiene) made by reacting a carboxy-terminated poly (1,2-butadiene) and a difunctional compound in an equivalents ratio of difunctional compound carboxyl of about 0.5/1.

DETAILED DESCRIPTION OF THE INVENTION

The filament wound composites and resin-fiber combinations of this invention may employ a variety of fibers or filaments known in the filament winding art. These fibers include, but are not necessarily limited to, glass fibers, boron filaments, graphite (carbon) filaments and high modulus organic filaments, particularly organic filaments of the aramid type. Examples of high modulus organic filaments include, but are not imited to, poly (benzothiazoles) and poly (aromatic amides) which are commonly referred to simply as "aramids". Aramids include poly (benzamides) and family of materials sold by E.I. duPont under the trademark KEVLAR. The preferred fiber or filament for use in this invention is KEVLAR 49 aramid fiber because of the improved fiber stress performance it provides in pressure vessels as well as allowing a lower weight fraction of resin to be used compared to other fibers.

The resins employed in the filament wound composites and resin-fiber combinations of this invention comprise an aromatic vinyl hydrocarbon monomer and a chain-extended carboxy-terminated poly (1,2-butadiene) made by reacting a carboxy-terminated poly (1,2-butadiene) and a difunctional compound in an equivalents ratio of epoxide/carboxy of about 0.5/1.

The aromatic vinyl hydrocarbon monomers useful in the practice of this invention have one or more, though preferably only one, vinyl group, i.e., —C=C—, attached directly to an aromatic ring, preferably a benzene ring. Examples of such aromatic vinyl hydrocarbon monomers include, but are not limited to, styrene; o-, m- and p- vinyl toluene; o-, m- and p- ethyl styrene; o- and p- isopropyl styrene; 2, 4-diisopropyl styrene; 2, 5- diisopropyl styrene; 2, 4-dimethyl styrene; 3, 4-dimethyl styrene; vinyl mesitylene; vinyl durene; t-butyl styrene and divinyl benzene. The aromatic vinyl hydrocarbon monomer having the styrene structure are preferred, styrene and styrene substituted with 1 or 2 alkyl or alkenyl groups having 1 to 5 carbon atoms each (such as vinyl toluene; 2, 4-diisopropyl styrene; 2, 5-diisopropyl styrene; divinyl benzene and t-butyl styrene) are particularly preferred. Tert-butyl styrene and mixtures of aromatic vinyl hydrocarbon monomers containing primarily t-butyl styrene are most preferred for most formulations. Divinyl benzene, if employed, should be used in admixture with other aromatic vinyl hydrocarbon monomers to avoid excessive embrittlement of the cured resin. Preferably if divinyl benzene is employed it is less than ⅓ of the total amount of aromatic vinyl hydrocarbon monomer.

These aromatic vinyl hydrocarbon monomers improve the physical properties of the uncured resin and are especially useful for viscosity control. Thus, viscosities of less than about 5000 cps, preferably about 2000 cps, which are desirable viscosities for wet winding techniques and viscosities of about 50,000 cps to about 500,000 cps which are desirable for use in preimpregnated rovings or tapes (prepregs) can be achieved by mixing the aromatic vinyl hydrocarbon monomers with the chain-extended carboxy-terminated poly (1, 2 butadiene). While these viscosities could be obtained by the use of ordinary solvents, the aromatic vinyl hydrocarbon monomers are far preferable in that they are incorporated into the final cured resin and, thus, unlike ordinary solvents, need not be removed from the resin after cure. Furthermore, they do not cause un-acceptable water pick-up and produce a low density cured resin product.

The amount of aromatic vinyl hydrocarbon monomer employed in the resin system of this invention will depend upon several factors including the particular chain-extended carboxy-terminated poly (1, 2-butadiene) employed, the presence of other components in the resin system and the desired viscosity of the uncured resin system. Normally, the aromatic vinyl hydrocarbon monomer will be used in an amount sufficient to produce an uncured resin system with a viscosity of less than about 5000 cps (preferably about 2000 cps) for wet winding techniques and about 50,000 cps to about 500,000 cps for prepregs. Generally this means the resin system will contain about 10% to about 35%, preferably about 25% to about 35%, aromatic vinyl hydrocarbon monomer, all percentages being by weight based on the combined weight of the aromatic vinyl hydrocarbon monomer and chain-extended carboxy-terminated poly (1, 2-butadiene). Resin systems used for prepregs will usually contain up to about 20%, preferably about 10%, by weight of the vinyl aromatic monomer.

The chain-extended carboxy-terminated poly (1, 2-butadiene) useful in the practice of this invention is prepared from poly (butadiene) having an appropriate molecular weight in which about 80% or more, preferably 85% or more, of the butadiene repeating units are the 1, 2 isomer, i.e. about 80% or more of the repeating units are of the structure

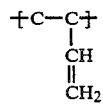

This poly (1, 2-butadiene) is modified by adding carboxyl (—COOH) groups or carboxyl-containing groups to both ends of the polymer. The ideal 2.0 carboxyl groups per molecule is rarely achieved, but polymers with somewhat less than 2.0 carboxyls per molecule are acceptable. For example, carboxyl-terminated poly (1, 2-butadiene) sold by Nippon Soda Co., Ltd. under the designation "C 1000" has about 1.6–1.8 carboxyls per molecule and performs well in the practice of this invention. This material has an average molecular weight of 1400±200 and a viscosity of 10,000–25,000 cps at 45° C.

The carboxy-terminated poly (1, 2-butadiene) is reacted with a difunctional compound to form the chain-extended carboxy-terminated poly (1, 2-butadiene). The carboxy-terminated poly (1, 2-butadiene) and difunctional compound are reacted in proportions such that there are about twice as many carboxyl groups available for reaction as there are functional groups to react with them. In other words, the ratio of equivalents of functional groups to equivalents of carboxyl is about 0.5/1. This ensures that substantially all of the chain-extended polymer is carboxy-terminated.

The difunctional compounds useful in the practice of this invention are selected from diepoxides, diols, diamines and diisocyanates, the diepoxides being preferred.

These difunctional compounds include, for example, as diols, alkylene glycols and polyalkylene glycols (such as polypropylene glycol and poly(trimethylolpropane)); as diamines, aromatic diamines (such as toluene diamine, methylene dianiline), alkyl diamines (such as hexane diamine and menthane diamine); as diisocyanates, hexamethylene diisocyanate and toluene diisocyanate; and as diepoxides, aromatic, aliphatic, and cycloalphatic diepoxides (such as 1,4-butanediol diglycidyl ether, vinylcyclohexene dioxide and diglycidyl ether of bisphenol A).

The chain extension of the carboxy-terminated poly (1, 2-butadiene) with the difunctional compound may be achieved by techniques and using reaction conditions well known in the art. See, for example, U.S. Pat. No. 4,016,022 to Browning et al., in this regard.

While the resin systems of this invention principally comprise the aromatic vinyl hydrocarbon monomer and chain-extended carboxy-terminated poly (1, 2-butadiene), they may, and quite often do, contain other components as well. For instance, the resin systems generally require curing agents. These curing agents are employed in an amount effective to cure the resin system, i.e., an amount which will produce a fully cured product in a thermal cure sequence typically employed in filament winding processing. Generally, this amount will be from about 1% to about 12% by weight based on the weight of the chain-extended carboxyl-terminated poly (1, 2-butadiene). This amount of curing agent is relatively high compared to conventional resin systems, but is desirable because of the slow rate at which the resin system is heated to cure it and the desired high crosslink density in the cured resin.

Useful curing agents include free-radical generating materials, such as organic peroxides and azo compounds. Such curing agents are well known in the art and can include high temperature materials as well as those active at low temperature. Examples of organic peroxides useful as curing agents in this invention include, but are not limited to, the following.

dibenzoyl peroxide (BPO)
dilauryl peroxide
t-butyl peroxy-2-ethylhexanoate
t-amyl peroctoate
t-butyl perbenzoate
2,5-dimethyl-2,5-bis (benzoylperoxy) hexane
dicumyl peroxide
di t-butyl peroxide 1,1,3,3-tetramethyl butyl hydroperoxide
t-butyl hydroperoxide
2,4-pentanedione peroxide
methyl ethyl ketone peroxide
ethyl 3,3-bis (t-butylperoxy) butyrate
cyclic peroxy ketals The preferred organic peroxides are dibenzoyl peroxide, t-butyl perbenzoate and dicumyl peroxide, ofttimes used in combination to provide initiation of reaction at low temperatures, to prevent too low viscosity and attendant resin flow (loss), and to provide crosslinking reactions at elevated temperatures for generation of a high heat distortion temperature.

The resin systems of this invention are prepared by adding the aromatic vinyl hydrocarbon monomer in small portions to the chain-extended polymer. The curing agent may advantageously be dissolved or slurred in the aromatic vinyl hydrocarbon monomer and then added to the chain-extended polymer along with the aromatic vinyl hydrocarbon monomer.

The resin-fiber combinations of this invention may be made by techniques well known in the art. For example, if the resin-fiber combination is to be employed in wet winding, the fiber is simply run through a resin bath containing the composition of the present invention, whereby the fiber is coated with the composition. The resulting resin-fiber combination is then wound directly into the desired structure. On the other hand, if a prepreg is to be used, the fiber or "tape" is impregnated with a composition in accordance with this invention and then wound on a spool and stored for winding at a future time.

The filament wound composites of this invention can be made by filament winding techniques known in the art. The resin may be applied to the filament before (as in the case of the resin-fiber combinations of this invention), during or after winding. The cure cycle employed will depend upon the particular curing agents in the resin system. Generally, a multihour cure at elevated temperature is used. Typically, a 5–30 hour cure cycle at temperatures gradually increasing from room temperature to about 150° C. or higher is employed. Faster acting catalysts and/or initiators can be used to shorten the cure cycle, but may also result in an undersirably short pot life.

The resin-fiber combinations of this invention have excellent room temperature stability in the uncured state. This not only provides long shelf life for the resin-fiber combination, but also permits manufacture of large composites which may take several weeks to wind. Interruptions in the winding process, e.g. machine breakdowns, are also not as serious a problem as with other resin-fiber systems due to the room temperature stability of the resin-fiber combinations of this invention.

The filament wound composites of this invention possess significant advantages over composites made with epoxy resin matrices. There is a substantial weight savings with the composites of this invention as compared to epoxy resin composites due to a resin matrix density which is about 20% lower than that of the epoxies. Also, the cured resins in the composites of this invention are less polar and have higher moisture resistance than the epoxy resins.

The following examples are illustrative of the invention and are not intended to limit the scope of the invention in any manner.

EXAMPLE 1

This example illustrates the preparation of a chain-extended carboxy-terminated poly (1, 2-butadiene) (abbreviated HME below).

In a reaction vessel were mixed 91.2 parts by weight (pbw) of C-1000 carboxy-terminated poly (1, 2-butadiene) (molecular weight 1550, vinyl content 88.8%, acid number 59.4), 8.8 pbw Epon 826 diglycidyl ether of bisphenol A (which provided an equivalents ratio of epoxide/carboxyl of about 0.5/1) and 0.02 pbw chromium octoate. The resulting reaction mixture was heated to 80° C. and maintained at that temperature for about 40 hours. The resulting chain-extended carboxy-terminated poly (1, 2-butadiene) had a viscosity of about 4,000–8,000 cps at the reaction temperature of 80° C. which indicated that chain extension had occurred. When cooled, the reaction product had a viscosity of about 100,000 cps at 75° F.

EXAMPLE 2

This example illustrates a resin composition in accordance with the invention.

To 100 parts by weight (pbw) of the chain-extended carboxy-terminated poly (1, 2-butadiene) prepared in Example 1 were added 50 pbw of t-butyl styrene, 5 pbw t-butyl perbenzoate and 2 pbw dicumyl peroxide. The resulting mixture was thoroughly blended, cast into a ⅛ inch panel and step cured up to 140° C. The resulting cured resin had a density of 1.00, a tensile strength of 6140 psi, a tensile modulus of 354 psi×10$^{-3}$, an elongation of 2.3%, a mold shrinkage of 0.273 inches/10 inches, a glass transition temperature of about 133° C., and a water pick up (after 24 hour boil) of about 0.3%.

EXAMPLES 3–6

Resin compositions similar to that of Example 2 were prepared and cured as in Example 2 with the following results:

| EXAMPLE NO. | 3 | 4 | 5 | 6 |
|---|---|---|---|---|
| Int. Viscosity (70° F.) cps | — | — | 3400 | — |
| Density (g/ml) | 1.01 | — | 1.00 | 1.00 |
| Tg G" Max (°C.) | 123 | 120 | 130 (avg) | 124 |
| Tensile modulus (psi × 10$^{-3}$) | — | 308 | 311 | 314 |
| Strength (psi) | — | 6070 | 4230 | 3770 |
| Elong. (%) | — | 2.6 | 1.4 | 1.3 |
| Mold shrinkage (in/10 in.) | — | — | 0.183 | — |

EXAMPLES 7–20

These examples further illustrate resin compositions in accordance with this invention.

The following resin compositions were prepared as described in Example 2 using the ingredients shown in Table I with results similar to those of Example 2.

TABLE I

| | Parts By Weight | | | |
|---|---|---|---|---|
| EX. NO. | HME | T-BUTYL STYRENE | BPO | T-BUTYL- PERBEN- ZOATE | DICUMYL PEROXIDE |
| 7 | 100 | 20 | 2 | — | 4 |
| 8 | 100 | 20 | 2 | — | 4 |
| 9 | 100 | 20 | 1 | 3 | — |
| 10 | 100 | 20 | 1 | 5 | — |

TABLE I-continued

| EX. NO. | HME | T-BUTYL STYRENE | BPO | T-BUTYL-PERBEN-ZOATE | DICUMYL PEROXIDE |
|---|---|---|---|---|---|
| 11 | 100 | 20 | 1 | 3 | 2 |
| 12 | 100 | 20 | — | 5 | — |
| 13 | 100 | 50 | 1 | 7 | — |
| 14 | 100 | 50 | 1 | — | 7 |
| 15 | 100 | 100 | 2 | 10 | — |
| 16 | 100 | 100 | 2 | — | 10 |
| 17 | 100 | 50 | 2 | — | 10 |
| 18 | 100 | 50 | — | 5 | * |
| 19 | 100 | 50 | 1 | 5 | 2 |
| 20 | 100 | 50 | — | 5 | 2 |

*1.5 pbw Luazo 79 azo initiator (2-t-butylazo-2-cyanopropane used instead of dicumyl peroxide.

In order to test the effectiveness of a resin for filament winding, certain standard structures can be fabricated. They include NOL (Naval Ordanance Lab) rings, cylinders and pressure vessels (bottles), the latter being considered the best indication of resin effects.

In the following examples, pressure vessels were made using the resin systems of this invention and compared to structures using baseline epoxy resins.

EXAMPLES 21-22

Bottles were made using the resin formulation of Example 2 and Kevlar aramid fiber. The bottles were 5.75 in. in diameter and were wound at a wind angle of 13°. Two different bottles were made with lay-up sequences of (2 polar +2 hoop) and (2 polar +2 hoop)$_3$ respectively. Hydroburst test results are shown in the following table.

| EXAMPLE NO. | RESIN | STRESS RATIO $\sigma_p/\sigma_H$ | FIBER STRESS (ksi) |
|---|---|---|---|
| A | Epoxy | 0.567 | 348[1] |
| B | Epoxy | 0.581 | 382[2] |
| 21 | from Ex. 2 | 0.567 | 384[1] |
| 22 | from Ex. 2 | 0.581 | 384[2] |

[1] (2 polar + 2 hoop) lay-up
[2] (2 polar + 2 hoop)$_3$ interspersed lay-up

The foregoing examples demonstrate a significant increase in fiber stress for the (2 polar +2 hoop) lay-up and show no decrease fiber stress for the (2 polar +2 hoop)$_3$ interspersed lay-up for the bottles made from the resin of Ex. 2 (see Examples 21 and 22) as compared to the baseline epoxy resin (see Examples A and B). This is especially significant in view of the fact that the overall weight of the bottles from Examples 21 and 22 is 5-8% less than those of Examples A and B (at constant fiber volume). This 5-8% reduction in overall weight represents a decrease of about 20% in the weight of the resin used in Examples 21 and 22 compared to the weight of epoxy resin used in Examples A and B.

We claim:

1. A cured, filament wound composite comprising fibers in a matrix resin, said resin comprising whe uncured an aromatic vinyl hydrocarbon monomer and a chain-extended carboxy-terminated poly (1,2-butadiene) made by reacting a carboxy-terminated poly(1,2-butadiene) with a difunctional compound capable of reacting with carboxyl groups in an equivalents ratio of difunctional compound/carboxyl of 0.5/1.

2. The composite of claim 1 wherein said fibers are selected from the group consisting of glass fibers, boron filaments, graphite filaments and high modulus organic filaments.

3. The composite of claim 2 wherein the fibers are high modulus organic filaments selected from the group consisting of poly(benzothiazoles) and poly(aromatic amides).

4. The composite of claim 3 wherein the fibers are aramid fibers.

5. The composite of claim 1 wherein the aromatic vinyl hydrocarbon monomer is selected from the group consisting of styrene and styrene substituted with 1 or 2 alkyl or alkenyl groups.

6. The composite of claim 5 wherein the aromatic vinyl hydrocarbon monomer is t-butyl styrene.

7. The composite of claim 1 wherein the difunctional compound is selected from the group consisting of diepoxides, diols, diamines, and diisocyanates.

8. The composite of claim 7 wherein the difunctional compound is a diepoxide.

9. The composite of claim 1 wherein the resin, in its uncured state, comprises about 10% to about 35% aromatic vinyl hydrocarbon monomer, said percentages being by weight based on the combined weight of the monomer and chain-extended polymer, and an effective amount of a curing agent.

10. The composite of claim 9 wherein tne curing agent is an organic peroxide.

11. An uncured, resin-fiber combination in the form of a preimpregnated roving or tape wherein the fibers are impregnated with an uncured resin matrix comprising an aromatic vinyl hydrocarbon monomer and a chain-extended carboxy-terminated poly (1,2-butadiene) made by reacting a carboxy-terminated poly (1,2-butadiene) with a difunctional compound capable of reacting with carboxyl groups in an equivalents ratio of difunctional compound/carboxyl of about 0.5/1.

12. The resin-fiber combination of claim 11 wherein the fibers are selected from the group consisting of glass fibers, boron filaments, graphite filaments and high modulus organic filaments.

13. The resin-fiber combination of claim 12 wherein the fibers are high modulus organic filaments selected from the group consisting of poly(benzothiazoles) and poly(aromatic amides).

14. The resin-fiber combination of claim 13 wherein the fibers are aramid fibers.

15. The composite of claim 11 wherein the aromatic vinyl hydrocarbon monomer is selected from the group consisting of styrene and styrene substituted with 1 or 2 alkyl or alkenyl groups.

16. The resin-fiber combination of claim 15 wherein the aromatic vinyl hydrocarbon monomer is t-butyl styrene.

17. The resin-fiber combination of claim 11 wherein the difunctional compound is selected from the group consisting of diepoxides, diols, diamines, and diisocyanates.

18. The resin-fiber combination of claim 17 wherein the difunctional compound is a diepoxide.

19. The resin-fiber combination of claim 11 wherein the resin comprises about 10% to about 35% aromatic vinyl hydrocarbon monomer, said percentages being by weight based on the combined weight of the monomer and chain-extended polymer, and an effective amount of a curing agent.

20. The resin-fiber combination of claim 19 wherein the curing agent is an organic peroxide.

* * * * *